(12) United States Patent
Bandyopadhyay et al.

(10) Patent No.: US 11,880,345 B2
(45) Date of Patent: Jan. 23, 2024

(54) METHOD AND SYSTEM FOR GENERATING ANNOTATIONS AND FIELD-NAMES FOR RELATIONAL SCHEMA

(71) Applicant: Tata Consultancy Services Limited, Mumbai (IN)

(72) Inventors: Atreya Bandyopadhyay, Kolkata (IN); Indrajit Bhattacharya, Kolkata (IN); Rajdip Chowdhury, Kolkata (IN); Debayan Mukherjee, Kolkata (IN)

(73) Assignee: TATA CONSULTANCY SERVICES LIMITED, Mumbai (IN)

(*) Notice: Subject to any disclaimer, the term of this patent is extended or adjusted under 35 U.S.C. 154(b) by 188 days.

(21) Appl. No.: 17/463,591

(22) Filed: Sep. 1, 2021

(65) Prior Publication Data

US 2022/0121630 A1 Apr. 21, 2022

(30) Foreign Application Priority Data

Sep. 14, 2020 (IN) .............................. 202021039780

(51) Int. Cl.
  *G06F 16/21* (2019.01)
(52) U.S. Cl.
  CPC .................................. *G06F 16/211* (2019.01)
(58) Field of Classification Search
  CPC ......... G06F 16/211; G06F 16/20; G06F 16/21
  See application file for complete search history.

(56) References Cited

U.S. PATENT DOCUMENTS

| 9,336,306 B2 | 5/2016 | McAteer et al. |
| 11,436,469 B2 * | 9/2022 | Marin .................... G06N 3/006 |
| 11,500,905 B2 * | 11/2022 | Baughman ............ G06F 16/285 |
| 2017/0337268 A1 * | 11/2017 | Ait-Mokhtar ....... G06F 16/3344 |
| 2020/0158722 A1 * | 5/2020 | Mallick ............ G01N 33/54353 |
| 2020/0231466 A1 * | 7/2020 | Lu ........................... G01N 33/18 |
| 2022/0027777 A1 * | 1/2022 | Schmidt ................... G06N 5/01 |

OTHER PUBLICATIONS

Futia et al., "SeMi: A SEmantic Modeling machine to build Knowledge Graphs with graph neural networks," SoftwareX 12 (2020).
Taheriyan et al., "A Graph-Based Approach to Learn Semantic Descriptions of Data Sources," (2013).
Troullinou et al., "Ontology Understanding without Tears: The summarization approach," (2017).

* cited by examiner

*Primary Examiner* — Miranda Le
(74) *Attorney, Agent, or Firm* — FINNEGAN, HENDERSON, FARABOW, GARRETT & DUNNER LLP

(57) ABSTRACT

This disclosure relates generally to generating annotations and field-names for a relational schema. Typically, most domains have relational database (RDB) system built for them instead of domain ontologies and usually linguistic information of the schema is not used to recover the domain terms. The disclosed method and system facilitate generating annotations and field-names for a relational schema, while considering the linguistic information of a schema by using a trained model, trained through a proposed training technique. The trained model comprises of at least one knowledge graph and a set of associated parameters. The trained model is further used to perform a plurality of tasks, wherein the plurality of tasks include generating a plurality of new fieldnames for a relational schema through a stochastic generative process and for generating a new annotation for a fieldname of a relational schema through a probabilistic inference technique.

3 Claims, 14 Drawing Sheets

METHOD AND SYSTEM FOR GENERATING ANNOTATIONS AND FIELD-NAMES FOR RELATIONAL SCHEMA

PRIORITY CLAIM

This U.S. patent application claims priority under 35 U.S.C. § 119 to: India Application No. 202021039780, filed on 14 Sep. 2020. The entire contents of the aforementioned application are incorporated herein by reference.

TECHNICAL FIELD

The disclosure herein generally relates to the field of domain knowledge graph and, more particularly, to generating annotations and field-names for a relational schema.

BACKGROUND

A domain specific knowledge graph represents domain-specific definitions of terms or words. Domain knowledge graph consists of domain concepts terms along with typed relationship between concepts. Domain knowledge graph has several applications such as matching disparate schemas of the same domain (schema matching), explanation of schema fields in terms of domain concepts-relationships (schema annotation) and further assist schema designers to create new schemas.

The domain knowledge graph represents concepts and relationship between the concepts very specific to a domain. Considering the complexity of concepts and relationships, the generation of domain knowledge graph requires availability of domain experts to build the domain knowledge graph from scratch. However, availability of domain experts is challenging and further building the domain knowledge graph from scratch is a time-consuming task. Hence, most domains have relational database system built instead of domain knowledge graph, but the linguistic information is not used in relational database systems by existing work on knowledge graph generation.

Few conventional techniques to create/generate domain knowledge graph based on a single vertex/concept, where a single vertex/concept is learned from a table or a field. The conventional techniques to create/generate domain knowledge graph based on a single vertex/concept may not be very effective as a single vertex for a schema element may not be expressive. Further many existing techniques fail to identify the domains terms corresponding to the concepts. Conventional technique for annotating schema annotates tables or field with a single vertex/concept in the knowledge graph. This is ineffective for complex schemas.

SUMMARY

Embodiments of the present disclosure present technological improvements as solutions to one or more of the above-mentioned technical problems recognized by the inventors in conventional systems. For example, in one embodiment, a method for generating annotations and field-names for a relational schema is provided.

The method includes receiving an input associated with a relational schema of a database, via a one or more hardware processors, the input comprising a plurality of relational data and an existing knowledge graph of a domain, wherein the plurality of relational data comprises of one of an annotated relational data and an unannotated relational data. Further, the method includes training a pre-defined probabilistic generative model using the input to obtain a trained model, by the one or more hardware processors, the trained model comprising of at least one knowledge graph (G) and a set of associated parameters (θ) through a training technique, where the training technique comprises one of a supervised training and an unsupervised training, wherein: determining whether the input is an unannotated relational data or an annotated relational data; and performing, upon determining, one of: on determining the input is the annotated relational data, performing the supervised training, wherein the supervised training is based on a Maximum Likelihood Estimation (MLE) technique and on determining the input is the unannotated relational data, performing the unsupervised training, wherein the unsupervised training is based on the Expectation Maximization (EM) technique. Further, the method includes performing a plurality of tasks using the trained model, wherein the plurality of tasks comprises of generating a plurality of new fieldnames for a new relational schema through a stochastic generative process and generating a new annotation for a fieldname of a new relational schema through a probabilistic inference technique.

In another aspect, a system for generating annotations and field-names for a relational schema is provided. The system includes a memory storing instructions, one or more communication interfaces; and one or more hardware processors coupled to the memory via the one or more communication interfaces, wherein the one or more hardware processors are configured by the instructions for receiving an input associated with a relational schema of a database, via a one or more hardware processors, the input comprising a plurality of relational data and an existing knowledge graph of a domain, wherein the plurality of relational data comprises of one of an annotated relational data and an unannotated relational data The one or more hardware processors are further configured by the instructions for training a pre-defined probabilistic generative model using the input to obtain a trained model, by the one or more hardware processors, the trained model comprising of at least one knowledge graph (G) and a set of associated parameters (θ) through a training technique, where the training technique comprises one of a supervised training and an unsupervised training, wherein: determining whether the input is an unannotated relational data or an annotated relational data; and performing, upon determining, one of: on determining the input is the annotated relational data, performing the supervised training, wherein the supervised training is based on a Maximum Likelihood Estimation (MLE) technique and on determining the input is the unannotated relational data, performing the unsupervised training, wherein the unsupervised training is based on the Expectation Maximization (EM) technique. The one or more hardware processors are further configured by the instructions for performing a plurality of tasks using the trained model, wherein the plurality of tasks comprises of generating a plurality of new fieldnames for a new relational schema through a stochastic generative process and generating a new annotation for a fieldname of a new relational schema through a probabilistic inference technique.

In yet another aspect, a non-transitory computer readable medium for generating annotations and field-names for a relational schema is provided. The program includes receiving an input associated with a relational schema of a database, via a one or more hardware processors, the input comprising a plurality of relational data and an existing knowledge graph of a domain, wherein the plurality of relational data comprises of one of an annotated relational data and an unannotated relational data. Further, the program includes training a pre-defined probabilistic generative model using the input to obtain a trained model, by the one or more hardware processors, the trained model comprising of at least one knowledge graph (G) and a set of associated parameters (θ) through a training technique, where the training technique comprises one of a supervised training and an unsupervised training, wherein: determining whether the input is an unannotated relational data or an annotated relational data; and performing, upon determining, one of: on determining the input is the annotated relational data, performing the supervised training, wherein the supervised training is based on a Maximum Likelihood Estimation (MLE) technique and on determining the input is the unannotated relational data, performing the unsupervised training, wherein the unsupervised training is based on the Expectation Maximization (EM) technique. Further, the program includes performing a plurality of tasks using the trained model, wherein the plurality of tasks comprises of generating a plurality of new fieldnames for a new relational schema through a stochastic generative process and generating a new annotation for a fieldname of a new relational schema through a probabilistic inference technique.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 6A illustrates sampling a first node/concept named "billing" using the distribution $P_f$, with the parameters of distribution as shown in the table next to the figure, in accordance with an example embodiment of the disclosure. FIG. 6B illustrates sampling of a next edge for the concept "billing" referred to as "hasA" using the distribution $P_t$, in accordance with an example embodiment of the disclosure. FIG. 6C illustrates sampling of a next concept named 'customer', in accordance with an example embodiment of the disclosure. FIG. 6D illustrates sampling of a next edge for the concept "customer" referred to as "hasA" using the distribution $P_t$, in accordance with an example embodiment of the disclosure. FIG. 6E illustrates sampling of a next concept named 'customerID' using the distribution $P_f$, in accordance with an example embodiment of the disclosure. FIG. 6F illustrates stopping the sampling using the distribution $P_f$, in accordance with an example embodiment of the disclosure. FIG. 6G illustrates sampling for each of the concept a mention (sequence of one or more token) using the distribution $P_m$ and further concatenation of all the fieldnames from FIG. 6A to FIG. 6F to obtain the final field name.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Complete Description of Embodiments

A relational schema or schema of a database consists of a set of tables and each table contains a set of fields where each field has a field name and data. An example of table from a relational schema of a database with relevant content is described in TABLE 1. Herein, it will be understood that the example provided in table I (name of the table is "Order") is only for illustrative purposes and should not be construed as limiting to the embodiments.

TABLE I

| | | Order | | |
|---|---|---|---|---|
| Order ID | Order Amount | Bill to Zip Code | Date of Order | Order Shipment Zip Code |
| 1234 | 34 | 560054 | 12 August | 78908 |
| 3468 | 81 | 234679 | 17 August | 56799 |

In the above example, the table name is 'Order' and the table comprises of columns/fields the first row represents the field names. The subsequent rows have data for each field.

Figure 3A:
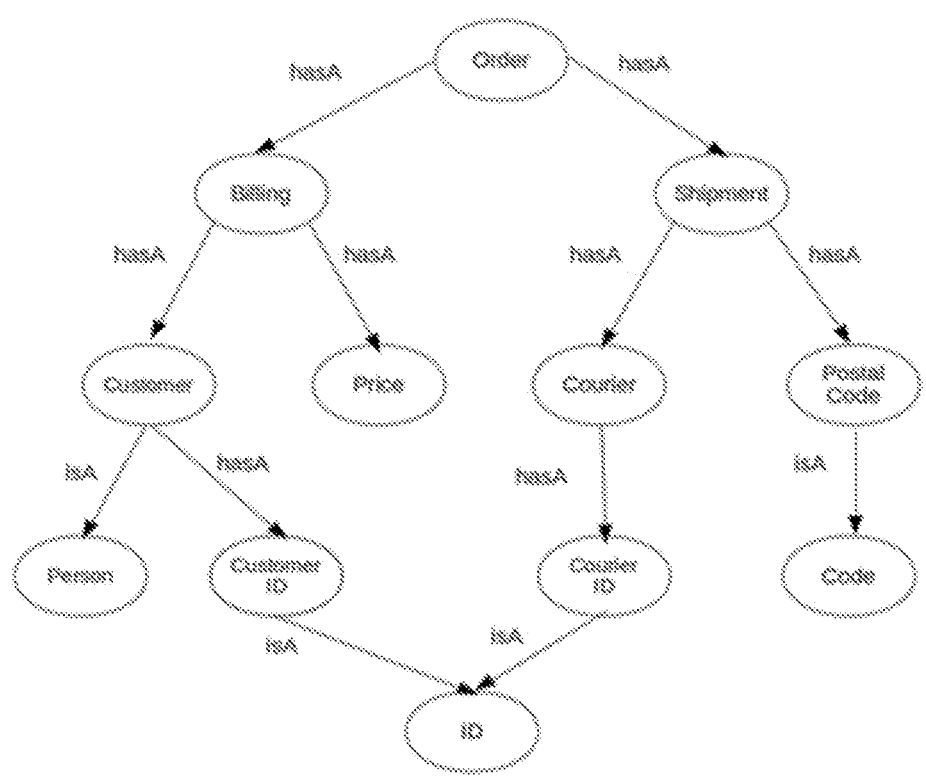
FIG. 3A and FIG. 3B illustrates an example of a knowledge graph and a annotation for a relational schema respectively in accordance with an example embodiment

A knowledge graph is a directed graph represented by G and expressed as G(V,E), wherein V is the vertex set and E is the edge set. For each vertex v∈V represents a domain concept and each edge, (u,v,t) is a triple representing a typed relationship between vertices. Further each edge connects vertex u to vertex v where t denotes the type of relationship represented by the edge, in an example relationship of two types 'has a' and 'is a' are considered as t∈{hasA,isA}. An example of knowledge graph is illustrated in FIG. 3A. In the present disclosure, the terms 'vertex' and 'concept' have been used interchangeably.

Figure 3B:
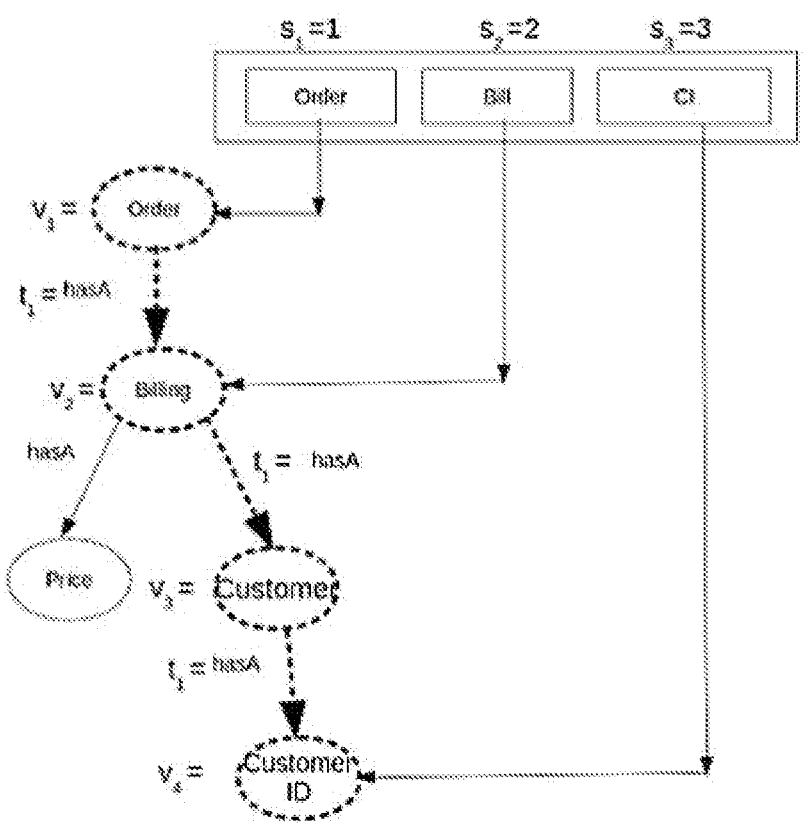
Figure 4:
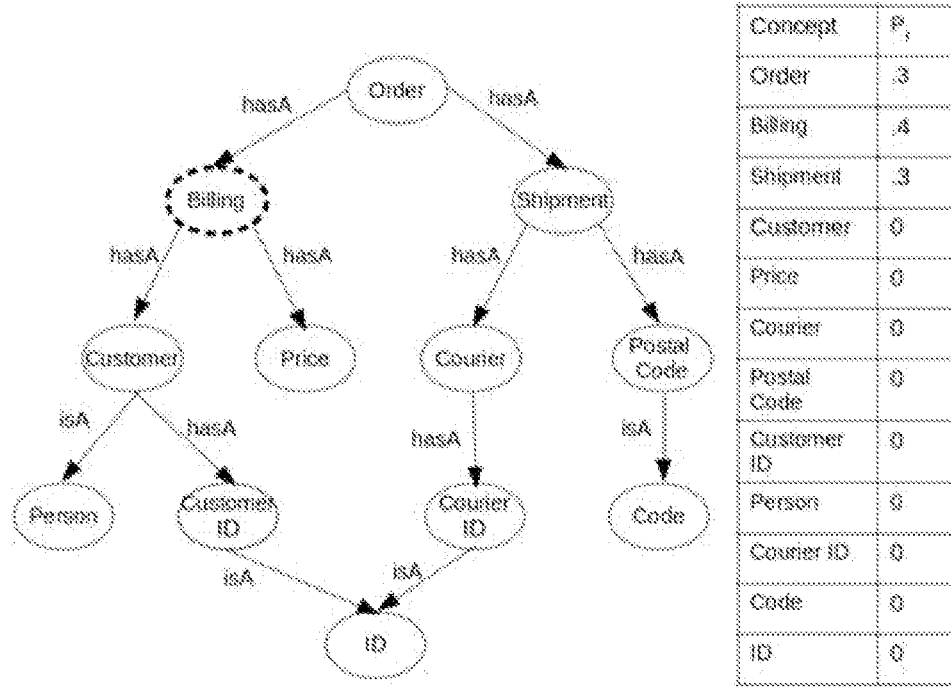
FIG. 4 illustrates an example of the knowledge graph along with the set of associated parameters in accordance with an example embodiment.

An annotation of a relational schema by a given knowledge graph is an explanation of a schema with respect to the knowledge graph. To define an annotation of schema, an annotation of a field name is first defined. An annotation of a field name is a path in the domain knowledge graph and associations between concepts in the path and token sequence in the field name. An example of an annotation for a fieldname is illustrated in FIG. 3B, wherein for the field named 'order bill CI' the annotation of the field consists of the path 'Order' hasA 'Billing' hasA 'Customer' hasA 'Customer ID', and associations between order token in the field name and 'order' concept in the path, CI token in the field name and 'customer ID' concept in the knowledge graph and so on. The annotation is defined as $\alpha_i = (v_{i1}, s_{i1}, t_{i1}, v_{i2}, s_{i2}, t_{i2}, \ldots v_{ik}, s_{ik}, t_{ik})$. $(v_{i1}, v_{i1})$ is relationship in the graph between concepts $v_{i1}$ and $v_{i2}$ of type $t_{i1}$, wherein $s_{i1}$ to $s_{i2-1}$ are a set of token's are associated with concept $v_{i1}$. The tokens are the surface form of a domain concept, wherein the same domain concept can be represented using different surface forms or mentions, wherein surface forms can be synonyms or abbreviations. An example of mention is a term 'postal code' that can be also represented as 'zip code' or 'PC'. Hence an annotation of a relational schema is set of annotations $A=\{\alpha_i\}$ where path $\alpha_i$ is the annotation of the fieldname $f_i$ in a relational schema. Further an annotation of a field has an associated score quantifying how meaningful the annotation of the field is.

Referring now to the drawings, and more particularly to FIG. 1 through FIG. 7, where similar reference characters denote corresponding features consistently throughout the figures, there are shown preferred embodiments and these embodiments are described in the context of the following exemplary system and/or method.

Figure 1:
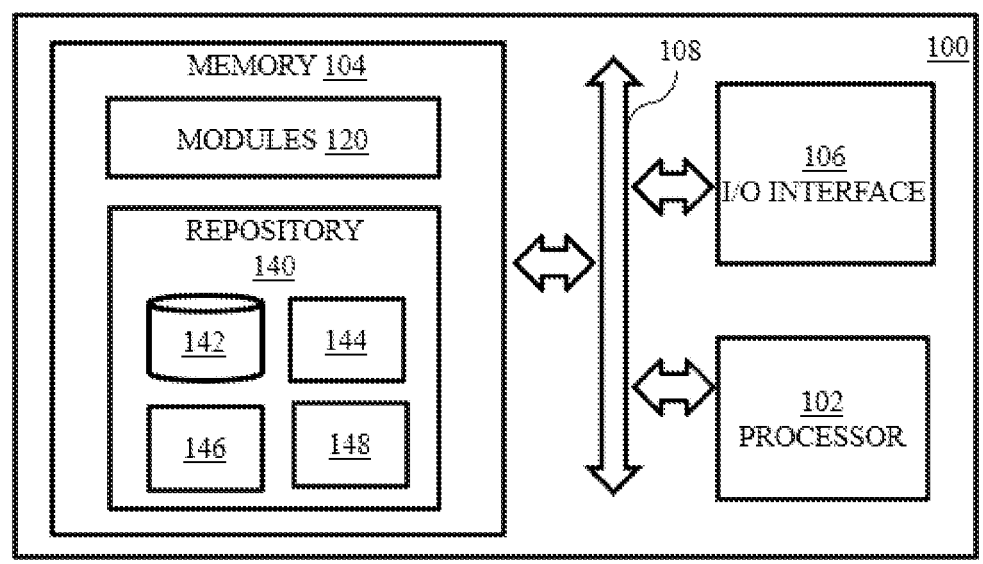
FIG. 1 illustrates a block diagram of a system for generating annotations and field-names for a relational schema, according to some embodiments of the present disclosure.

FIG. 1 illustrates a block diagram of a system 100 for generating annotations and field-names for a relational schema, according to some embodiments of the present disclosure. In an embodiment, the system 100 generates annotations and field-names for a relational schema. In an example scenario, when a relational schema of a database is provided as an input to the system 100, the system trains a pre-defined probabilistic generative model to obtain a trained model using the input. Further, the system 100 generates annotations and field-names for either the input relational schema or any relational schema based on the trained model. Hence the present disclosure generates annotations and fieldnames for a relational schema using a trained model, that is generated by the system 100 itself.

The system 100 includes or is otherwise in communication with one or more hardware processors such as a processor 102, at least one memory such as a memory 104, and an I/O interface 106. The processor 102, memory 104, and the I/O interface 106 may be coupled by a system bus such as a system bus 108 or a similar mechanism. The I/O interface 106 may include a variety of software and hardware interfaces, for example, a web interface, a graphical user interface, and the like. The interfaces 106 may include a variety of software and hardware interfaces, for example, interfaces for peripheral device(s), such as a keyboard, a mouse, an external memory, a camera device, and a printer. Further, the interfaces 106 may enable the system 100 to communicate with other devices, such as web servers and external databases. The interfaces 106 can facilitate multiple communications within a wide variety of networks and protocol types, including wired networks, for example, local area network (LAN), cable, etc., and wireless networks, such as Wireless LAN (WLAN), cellular, or satellite. For the purpose, the interfaces 106 may include one or more ports for connecting a number of computing systems with one another or to another server computer. The I/O interface 106 may include one or more ports for connecting a number of devices to one another or to another server.

The hardware processor 102 may be implemented as one or more microprocessors, microcomputers, microcontrollers, digital signal processors, central processing units, state machines, logic circuitries, and/or any devices that manipulate signals based on operational instructions.

Among other capabilities, the hardware processor 102 is configured to fetch and execute computer-readable instructions stored in the memory 104.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 104 includes a plurality of modules 120 and a repository 140 for storing data processed, received, and generated by one or more of the modules 120. The modules 120 may include routines, programs, objects, components, data structures, and so on, which perform particular tasks or implement particular abstract data types.

The repository 140, amongst other things, includes a system database 142 and other data 144, 146 and 148. The other data 144, 146 and 148 may include data generated as a result of the execution of one or more modules in the other modules 144, 146 and 148 comprises of a data for generating a trained model, generating annotations and generating fieldnames.

Figure 2:
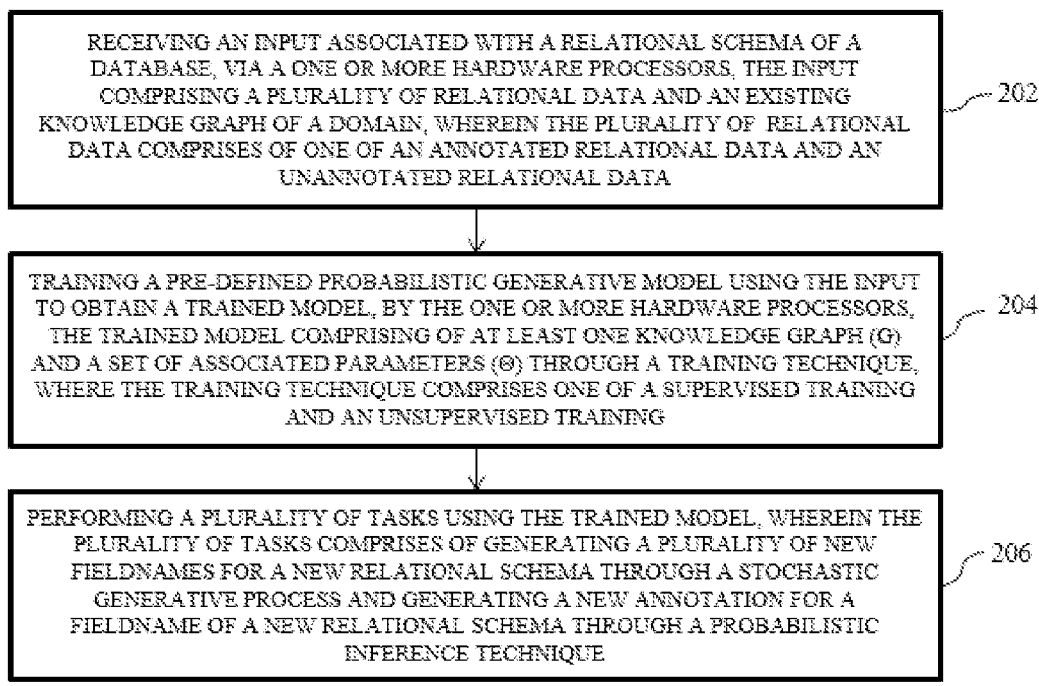
FIG. 2 is a flow diagram of a method for generating annotations and field-names for a relational schema in accordance with an example embodiment.

Referring to FIG. 2, a flow diagram of a method 200 for generating annotations and field-names for a relational schema is described in accordance with an example embodiment. The method 200 depicted in the flow chart may be executed by a system, for example, the system, 100 of FIG. 1. In an example embodiment, the system 100 may be embodied in a computing device.

Operations of the flowchart, and combinations of operation in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of a system and executed by at least one processor in the system. Any such computer program instructions may be loaded onto a computer or other programmable system (for example, hardware) to produce a machine, such that the resulting computer or other programmable system embody means for implementing the operations specified in the flowchart. It will be noted herein that the operations of the method 200 are described with help of system 100. However, the operations of the method 200 can be described and/or practiced by using any other system.

At 202 of the method 200, the disclosed system 100 may receive an input associated with a relational schema of a database, via a one or more hardware processors. The input incudes a plurality of relational data and an existing knowledge graph of a domain, wherein the plurality of relational data of one of an annotated relational data and an unannotated relational data. The plurality of relational data comprises of a plurality of field names.

In an embodiment, the existing knowledge graph comprises of a plurality of vertices and a plurality of edge. Each of the vertex represents a domain concept and each of the edge represents a typed relationship between two vertices. The received existing knowledge graph comprises of one of empty knowledge graph and a partially filled knowledge graph, wherein the empty knowledge graph does not comprise any concepts or any relationships and the partially filled knowledge graph comprises at least one concept. In an embodiment, the unannotated relational data comprises of a plurality of fieldnames ($F_1$) and the annotated relational data comprises of a plurality of fieldnames ($F_2$) and a annotation (A) for each of the fieldname, wherein the annotation is a path in the existing knowledge graph associated with the fieldname.

An example of the unannotated relational data that comprises of a plurality of fieldnames (F) field names as shown in Table 2 below. It will be understood that the example provided in table 2 is only for illustrative purposes and should not be construed as limiting to the embodiments.

TABLE 2

Table of unannotated relational data with fieldnames

| Sl. No. | Fieldname |
|---|---|
| 1 | order billing postal code |
| 2 | order billing customer id |
| 3 | order shipment country |
| 4 | order shipment state |

An example of the annotated relational data comprises of a plurality of fieldnames (F) and a corresponding annotation (A) for each of the fieldname as shown below in Table 3. It will be understood that the example provided in table 3 is only for illustrative purposes and should not be construed as limiting to the embodiments.

TABLE 3

Table of annotated relational data with fieldnames and corresponding annotations

| Fieldname | Annotation |
|---|---|
| order billing zip code | order, 1, hasA,, billing, 2, hasA,, postal, code, 4 |
| order billing CI | order, 1, hasA,, billing, 2, hasA,, customer ID, 4, |
| order shipment country | order, 1, hasA,, shipment, 2, hasA, country, 3, |
| order shipment state | order, 1, hasA, shipment, 2, hasA, state, 3 |

At 204, the method 200 includes training a pre-defined probabilistic generative model to obtain a trained model, by the one or more hardware processors, the trained model comprising of at least one knowledge graph (G) and a set of associated parameters (θ) obtained through a training technique. The training technique comprises of a supervised training and an unsupervised training, which would be explained in below sections.

Figure 5:
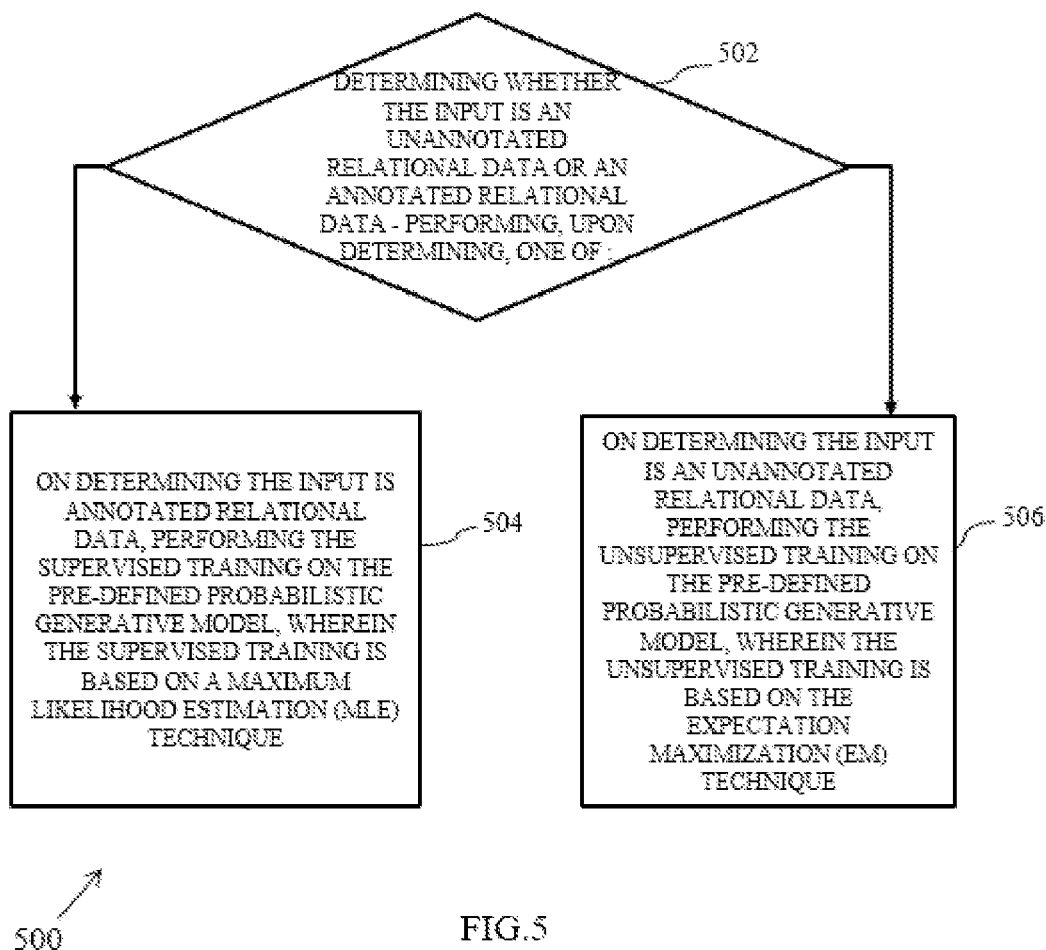
FIG. 5 is a flow diagram of a method for determining a training technique based on the input received in accordance with an example embodiment.

In an embodiment the pre-defined probabilistic generative model comprises of at least one knowledge graph (G) and a set of associated parameters (θ), wherein the set of parameters are associated with a plurality of concepts and a plurality of relationships in the knowledge graph. In an embodiment, the set of associated parameters (θ) for the knowledge graph are defined based on a probability distribution. An example of the knowledge graph along with the set of associated parameters (θ) is illustrated in FIG. 5, wherein the concepts/vertex and the corresponding parameters are represented as probabilistic distribution (P).

Further the pre-defined probabilistic generative model defines the probability distribution over a set of field names (F), a set of annotation (A) for each field names), a knowledge graph (G) and a stochastic process to generate a set of field names (F) In an embodiment, the set of probability distribution is listed below:

$P_f(c|G)$ multinomial distribution denoting probability of a concept c appearing at the beginning of an annotation of a field.

$P_t(u|v,t,G)$ multinomial distribution denoting probability of transition from concept v to u in the annotation of a field given the type of relationship, t.

$P_l(c|G)$ Bernoulli distribution denoting the probability that a concept c is the last concept in an annotation of a field.

$P_t(t|t',c,G)$ is multinomial distribution denoting probability of an relationship being of type isA or hasA depending on the type of previous relationship and the previous concept in the annotation.

$P_m(m|C)$ is the multinomial distribution denoting the probability of a mention m for concept c in a field name.

Further following allowances are made to the probability distribution to expand the graph (including unseen concepts and relationship):

$P_f(c|G)$ is $epsilon_e$ for concepts not in the graph $P_t(u,v|G)$ is $epsilon_e$ for relationship to concepts in the graph to which there are no existing relationship and $epsilon_0$ for relationship to concepts not in the graph.

The pre-defined probabilistic model based on a joint probability distribution over F (Schema/set of field names), G (knowledge graph) and A (annotation of the schema) is as expressed below:

$$P(G,F,A,\theta) = \Pi_{c \in_c} P_f(c|G)^{n_f(c)-1} * P_l(c|G)^{n_l(c)}(1-P_l(c|G))^{n_{f_1}}$$

$$[\Pi_m P_m(m|c)^{n_m(m,c)}]_{(u,v,t,t')} \Pi_{(u,v,t,t') \in_e}(P_t(v|u,t,G)P_t(t|t',c,G)^{n_e}$$

Where;

{$n_f(c)$}: occurrence of c at the beginning of the path
{$n_l(c)$}: occurrence of c at the end of the path
{$n_t(c)$}: occurrence of c not at the end of the path
{$n_e(u,v,t,t')$}: occurrence of relationship (u; v) of type t in path following relationship of type t'
{$n_m(m,c)$}: occurrence of mention m of c in names.

In an embodiment, the training technique comprises of a supervised training and an unsupervised training, as will be explained below with reference to FIG. 5, a flow diagram of a method 500 for determining the training technique based on the input received.

At step 502, the method 500 includes determining whether the input is an unannotated relational data or an annotated relational data and performing, upon determining, one of step (504 or 506) as described below:

At 504, the method 500 includes on determining the input is annotated relational data, performing the supervised training on the pre-defined probabilistic generative model, wherein the supervised training is based on a Maximum Likelihood Estimation (MLE) technique. The Maximum Likelihood Estimation (MLE) includes optimizing the existing knowledge graph (G) and the set of associated parameters (θ).

In an embodiment, for a given knowledge graph (G) and annotated relational data which consists of set of field names (F) and annotation (A) the maximum likelihood estimation returns the parameters for which the pre-defined probabilistic generative model returns the highest score, which can be expressed as shown below:

$$\theta^* = \text{argmax}_\theta P(G,F,A,\theta)$$

At 506, the method 500 includes on determining the input is an unannotated relational data, performing the unsupervised training on the pre-defined probabilistic generative model, wherein the unsupervised training is based on the Expectation Maximization (EM) technique. Herein, Expectation Maximization (EM) technique includes a step for expectation and a second step for maximization as explained below. In an embodiment, the Expectation Maximization (EM) technique includes performing pre-defined number of iterations of an expectation process and a maximization process, wherein the expectation process is performed using the plurality of annotations (A) and the maximization process is performed using the G and the θ.

In an embodiment, expectation process is performed to obtain the plurality of annotations (A). A most likely annotation a* is estimated for each field name (f) in the set of field names (F) using the existing knowledge graph (G) and the set of associated parameters (θ) which can be expressed as shown below:

$$A^* = \mathrm{argmax}_p P(A|F,G;\theta)$$

In an embodiment, the maximization process is performed using the annotation (A*) obtained in the expectation step. A maximum likelihood (θ),(G) is obtained and can be expressed as shown below:

$$\text{Maximize likelihood}, L(\theta, G|F, A^*) = P(G, F, A^*; \theta)$$

At 206, the method 200 includes performing a plurality of tasks using the trained model, wherein the plurality of tasks comprises of generating a plurality of new fieldnames for a new relational schema through a stochastic generative process and generating a new annotation for a fieldname of a new relational schema through a probabilistic inference technique.

In an embodiment, the stochastic generative process for generating a fieldname of a new relational schema comprises sampling a path from the knowledge graph and further sampling a fieldname for the path.

In an embodiment, the step for sampling a path from a knowledge graph comprises of several sub steps. The first sub-step for sampling a path from a knowledge graph includes identifying a starting concept to be sampled by using the distribution $P_f$ then stop or continue is sampled from the distribution $P_j$. Herein a stop is sampled then the path sampling process stops, if continue is sampled, the next concept in the path is sampled, wherein to do so first the type of relationship to the next concept is sampled using the distribution $P_j$. Further the next concept is sampled using the distribution $P_t$. Further stop/continue is sampled using the distribution $P_j$. Sampling new concepts is continued using the mentioned procedure unless a sample stop after sampling a concept.

Further upon sampling the path, the next step for generating the fieldname is sampling a fieldname for the sampled path, wherein using a distribution $P_m$ a sample mention is obtained for each concept in the path, and the field name is a result of the concatenation of each sampled mention.

An example for stochastic generative process for generating a fieldname of a new relational schema is illustrated by FIG. 6A to FIG. 6G.

Figure 6A:
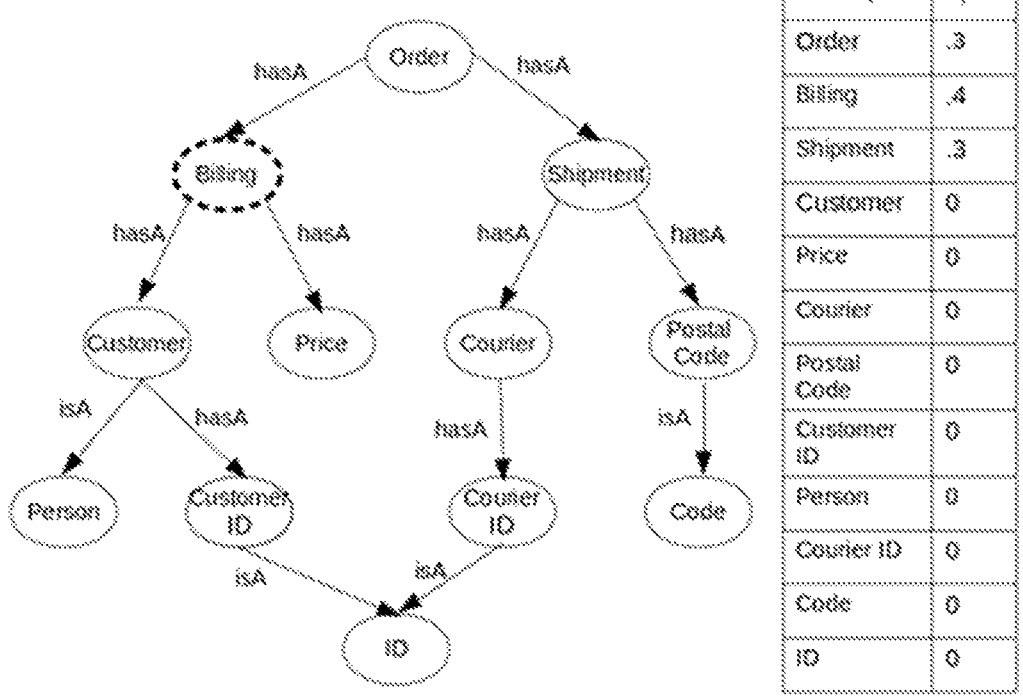
FIGS. 6A-6G illustrate an example representation for a stochastic generative process for generating a fieldname of a new relational schema, in accordance with an example embodiment of the disclosure.
Figure 6B:
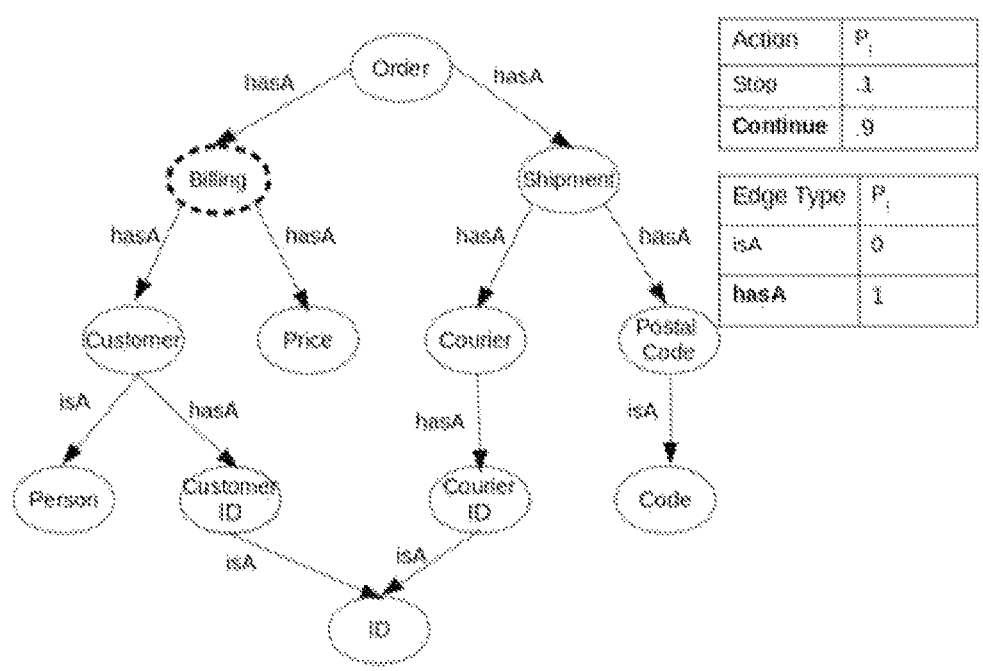
Figure 6C:
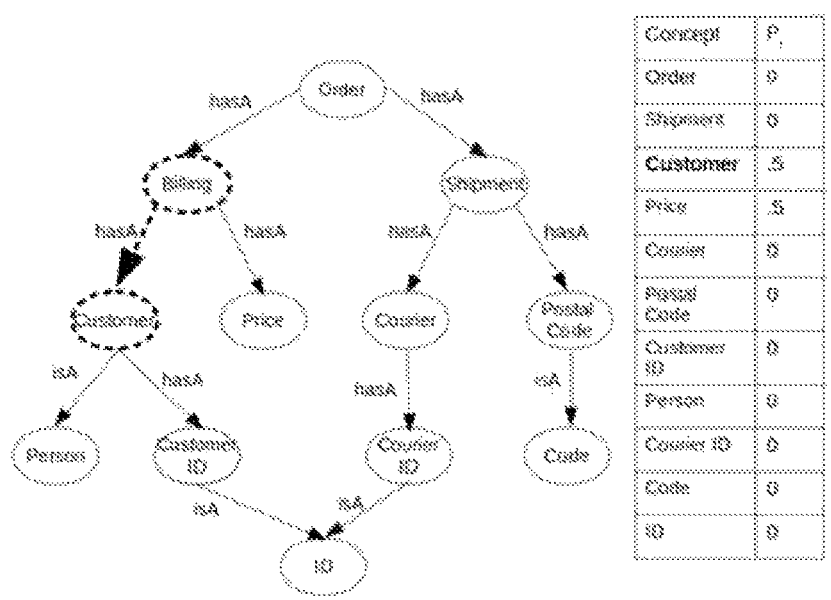
Figure 6D:
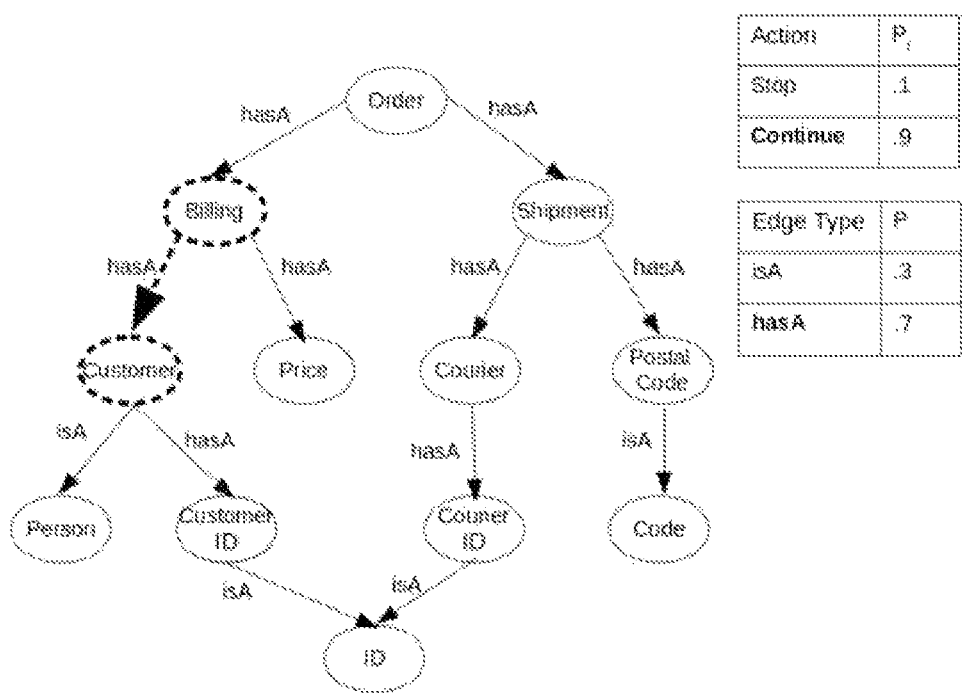
Figure 6E:
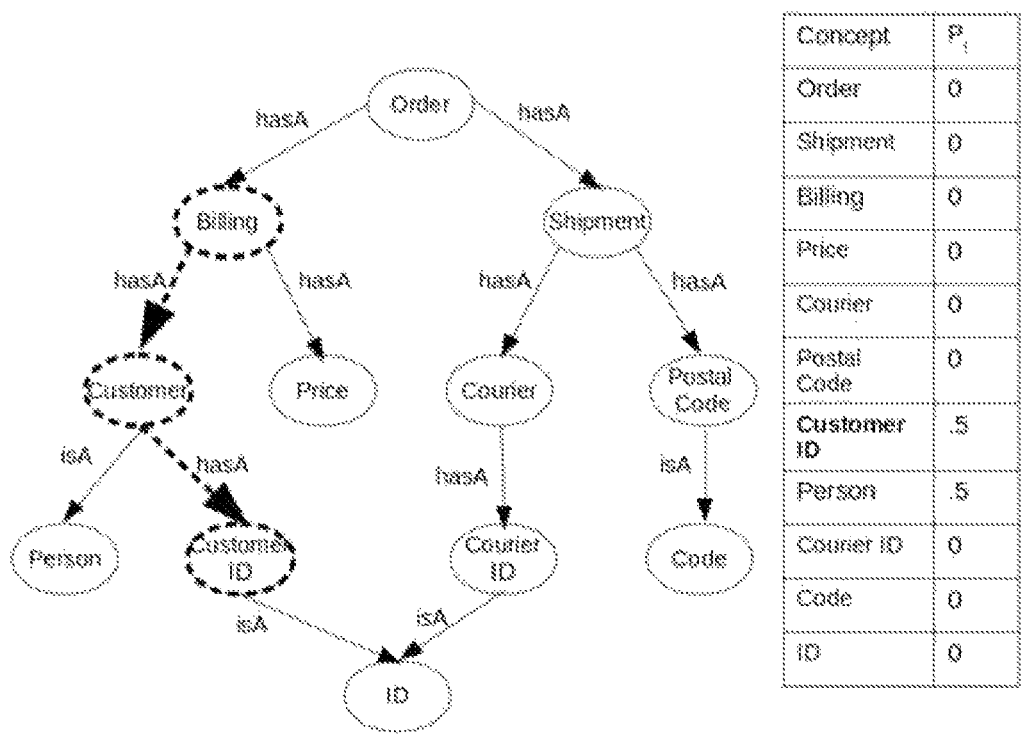
Figure 6F:
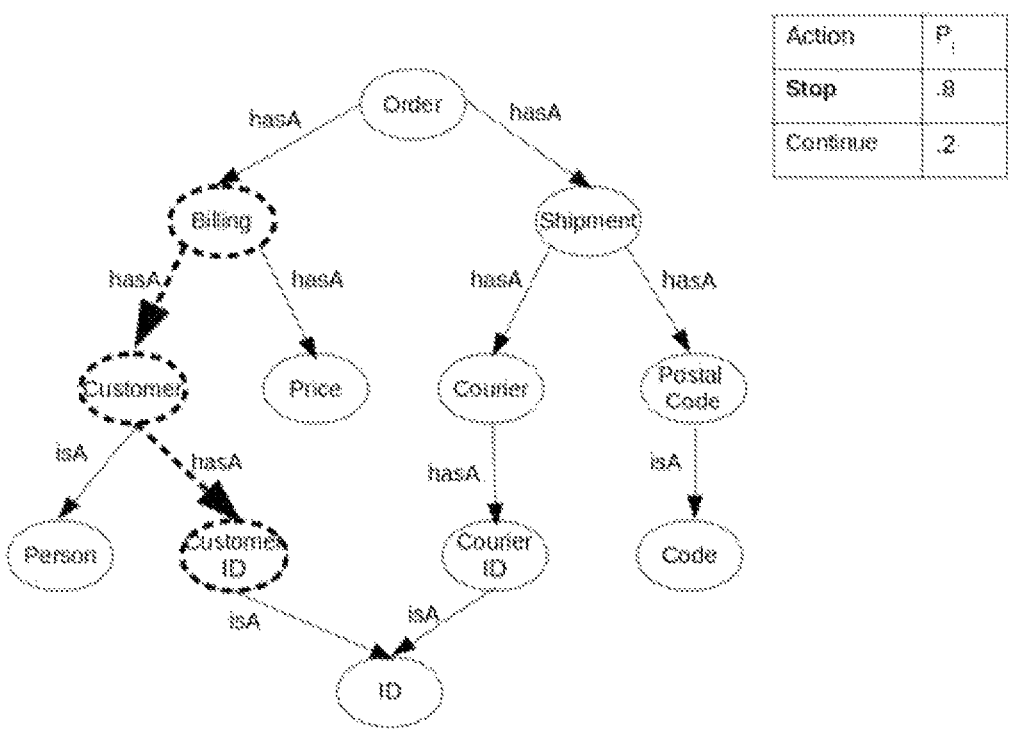
Figure 6G:
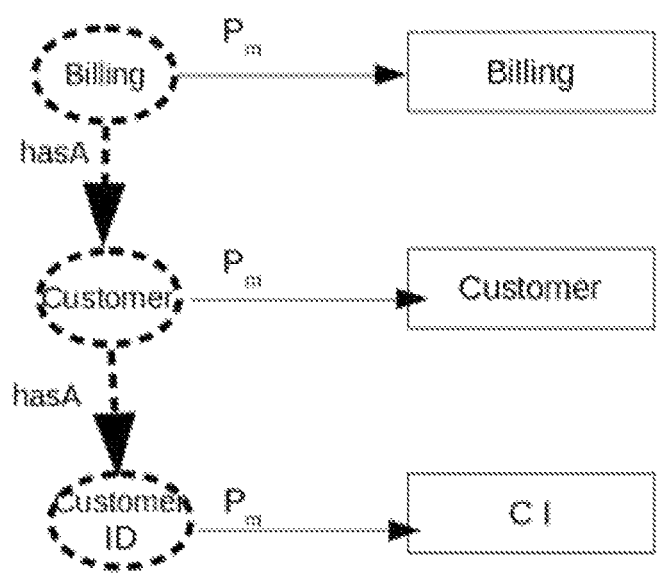

FIG. 6A illustrates sampling a first node/concept named "billing" using the distribution $P_f$, with the parameters of distribution as shown in the table next to the figure, in accordance with an example embodiment of the disclosure. FIG. 6B illustrates sampling of a next edge for the concept "billing" referred to as "hasA" using the distribution $P_j$, in accordance with an example embodiment of the disclosure. FIG. 6C illustrates sampling of a next concept named 'customer', in accordance with an example embodiment of the disclosure. FIG. 6D illustrates sampling of a next edge for the concept "customer" referred to as "hasA" using the distribution $P_t$, in accordance with an example embodiment of the disclosure. FIG. 6E illustrates sampling of a next concept named 'customerID' using the distribution $P_t$, in accordance with an example embodiment of the disclosure. FIG. 6F illustrates stopping the sampling using the distribution $P_j$, in accordance with an example embodiment of the disclosure. FIG. 6G illustrates sampling for each of the concept a mention (sequence of one or more token) using the distribution $P_m$ and further concatenation of all the fieldnames from FIG. 6A to FIG. 6F to obtain the final field name.

Figure 7:
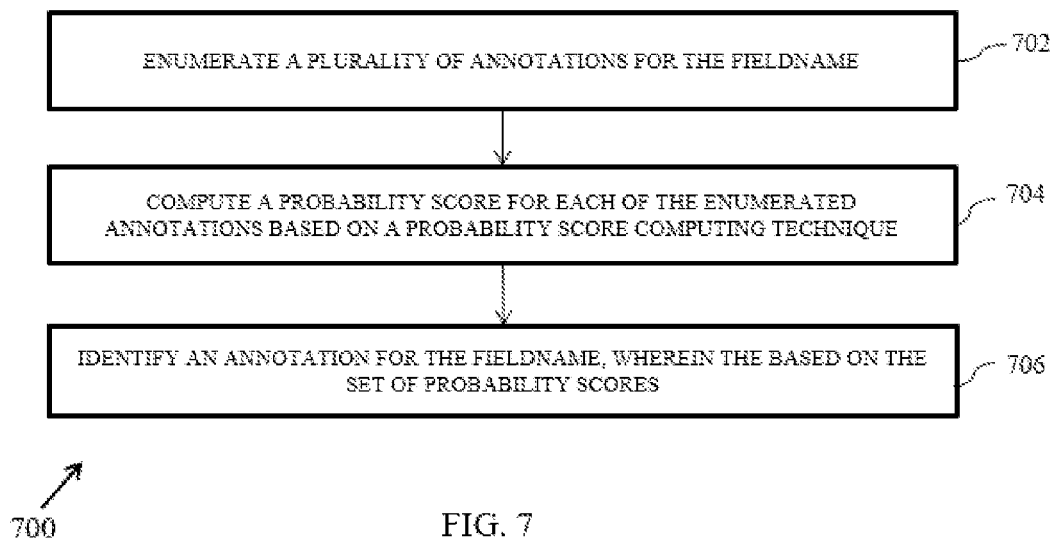
FIG. 7 is a flow diagram of a method for the probabilistic inference technique for generating the annotation in accordance with an example embodiment.

In an embodiment, the probabilistic inference technique for generating the annotation will be explained below with reference to FIG. 7, a flow diagram of a method 700 for:

At 702, the method 700 includes enumerating a plurality of annotations for the fieldname. In an embodiment, the step of enumerating the plurality of annotations for the fieldname comprises of several steps. The first step for step of enumerating the plurality of annotations for the fieldname includes enumerating a plurality of mention decompositions for the fieldnames wherein a mention decomposition is a plurality of terms. Further a plurality of concept decompositions are enumerated for the plurality of mention decomposition, wherein a concept is a vertex in the knowledge graph associated to a mention. Further for each concept decomposition a path is identified from the knowledge graph (G)

At 704, the method 700 includes computing a probability score for each of the enumerated annotations on a probability score computing technique. In an embodiment, the probability score is estimated based on the probability score computing technique that includes a conditional distribution technique. The conditional distribution is expressed as P(A|G,F;θ) which is proportional to P(G,F,A;θ).

At 706, the method 700 includes identifying an annotation for the fieldname based on the probability scores. In an embodiment, the annotation with a highest probability scores is identified as the annotation for the fieldname.

An example for the probabilistic inference technique for generating the annotation is explained using the FIG. 3A and FIG. 3B. Consider the knowledge graph of FIG. 3A with the field name "order bill CI" for which the corresponding annotation shown in FIG. 3B and expressed as A=(Order, 1,hasA;Billing,2,hasA; Customer, hasA; Customer ID,4,). The annotation consists of the path 'order' hasA 'billing' hasA 'customer' hasA 'customer id' and association between concepts in path and mentions in the field name, similarly billing is associated with the token at index 2, bill. Further to generate an annotation the first step is to enumerate all the mention decompositions, possible mention decomposition for the field name "order bill CI" includes [order, bill CI], [order, bill, CI]. Further a plurality of concept decomposition is identified for each mention decomposition, wherein for each mention in a mention decomposition possible concepts from the knowledge graph are identified. Hence for the mention decomposition [order, bill, CI] the possible concepts for CI is 'customer ID' and 'courier ID'. Possible concepts for 'bill' is 'billing' and for 'order' is 'order'. If there are no possible concept for a mention in the knowledge graph, then the concept having the mention name is introduced in the knowledge graph. All possible concepts are combined to enumerate all concept decomposition for a mention decomposition. The concept decompositions for the mention decomposition [order, bill, CI] are [order, billing, customer ID] and [order, billing, courier ID]. For each concept decomposition a path in the knowledge graph is identified. For the decomposition [order, billing, customer ID] a path between order and billing which is 'order' hasA 'billing' is identified. Further path between billing and customer ID is identified. The path is: 'billing' hasA 'customer' hasA 'customer ID'. If there is no path in the knowledge graph between two consecutive concepts in the decomposition, a new relationship is introduced in the knowledge graph between the concepts. Hence, the obtained annotations for the annotation is 'order' hasA 'billing' hasA 'customer' hasA 'customer ID'. A probability score is estimated for each of annotations using the defined probabilistic generative model & the annotation with highest score is selected as the annotation for the fieldname.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Various embodiments disclosed herein provides method and system that generates annotations and field-names for a relational schema. In an embodiment, the disclosed system facilitates generating annotations and field-names for a relational schema, while considering the linguistic information of a schema by using a trained model, trained through a proposed training technique. The trained model comprises of at least one knowledge graph and a set of associated parameters. The trained model is further used to perform a plurality of tasks, wherein the plurality of tasks include generating a plurality of new fieldnames for a relational schema through a stochastic generative process and for generating a new annotation for a fieldname of a relational schema through a probabilistic inference technique.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

We claim:

1. A processor-implemented method comprising:
receiving an input associated with a relational schema of a database, via a one or more hardware processors, the input comprising a plurality of relational data and a knowledge graph of a domain, wherein the plurality of relational data comprises of one of an annotated relational data and an unannotated relational data, wherein the unannotated relational data comprises of a plurality of fieldnames and the annotated relational data comprises of the plurality of fieldnames and an annotation for each fieldname of the plurality of fieldnames, wherein the knowledge graph comprises of a plurality of vertices and a plurality of edges, and wherein each of the plurality of vertices represents a domain concept and each of the edge represents a typed relationship between two vertices of the plurality vertices, and the knowledge graph comprises of one of an empty knowledge graph and a partially filled knowledge graph, wherein the empty knowledge graph does not comprise any vertices or any edges and the partially filled knowledge graph comprises at least one vertex, wherein the annotation is a path in the knowledge graph associated with the fieldname;

training a pre-defined probabilistic generative model using the input to obtain a trained model, by the one or more hardware processors, the trained model comprising of the knowledge graph (G) and a set of associated parameters (θ) through a training technique, wherein the set of parameters(θ) of the trained model are associated with a plurality of concepts and a plurality of relationships of the knowledge graph and the pre-defined probabilistic generative model defines (a) a probability distribution over a set of fieldnames, a set of annotation for each fieldname, the knowledge graph and (b) a stochastic process to generate the set of fieldnames, the set of annotation for each field name, where the training technique comprises one of a supervised training and an unsupervised training, wherein training the pre-defined probabilistic generative model to obtain the trained model comprises:

determining whether the input is an unannotated relational data or an annotated relational data, and performing, upon determining, one of:

on determining the input as the annotated relational data, performing the supervised training, wherein the supervised training is optimizing the knowledge graph (G) and the set of associated parameters using a Maximum Likelihood Estimation (MLE) technique; and on determining the input is the unannotated relational data, performing the unsupervised training, wherein the unsupervised training is based on the Expectation Maximization (EM) technique, wherein the EM technique includes performing a pre-defined number of iterations of an expectation process and a maximization process, wherein the expectation process is performed using the plurality of annotations and the maximization process is performed using the knowledge graph (G) and the set of associated parameters; and performing a plurality of tasks using the trained model, wherein the plurality of tasks comprises of generating a plurality of new fieldnames for a new relational schema through a stochastic generative process and generating a new annotation for a fieldname of a new relational schema through a probabilistic inference technique, wherein the stochastic generative process for generating the fieldname of the new relational schema comprises sampling a path from the knowledge graph and further sampling a fieldname from the path, wherein the probabilistic inference technique for generating the annotation comprises:

enumerating a plurality of annotations for the fieldname;

computing a probability score for each of the enumerated annotations based on a probability score computing technique; and identifying an annotation for the fieldname, based on the set of probability scores;

wherein the step for sampling the path from the knowledge graph comprises:

identifying a starting concept to be sampled by using distribution Pf, then a stop or a continue is sampled from distribution Pl, when stop is sampled, then the path sampling process stops, if continue is sampled, the next concept in the path is sampled, wherein first the type of relationship to the next concept is sampled using the distribution Pi, further the next concept is sampled using the distribution Pt, further stop or continue is sampled using the distribution Pl.

2. A system, comprising:

an input/output interface;

one or more memories; and one or more hardware processors, the one or more memories coupled to the one or more hardware processors, wherein the one or more hardware processors are configured to execute programmed instructions stored in the one or more memories to:

receive an input associated with a relational schema of a database, via a one or more hardware processors, the input comprising a plurality of relational data and a knowledge graph of a domain, wherein the plurality of relational data comprises of one of an annotated relational data and an unannotated relational data, wherein the unannotated relational data comprises of a plurality of fieldnames and the annotated relational data comprises of the plurality of fieldnames and an annotation for each fieldname of the plurality of fieldnames, wherein the knowledge graph comprises of a plurality of vertices and a plurality of edges, and wherein each of the plurality of vertices represents a domain concept and each of the edge represents a typed relationship between two vertices of the plurality vertices, and the knowledge graph comprises of one of an empty knowledge graph and a partially filled knowledge graph, wherein the empty knowledge graph does not comprise any vertices or any edges and the partially filled knowledge graph comprises at least one vertex, wherein the annotation is a path in the knowledge graph associated with the fieldname;

train a pre-defined probabilistic generative model using the input to obtain a trained model, by the one or more hardware processors, the trained model comprising of the knowledge graph (G) and a set of associated parameters (θ) through a training technique, wherein the set of parameters(θ) of the trained model are associated with a plurality of concepts and a plurality of relationships of the knowledge graph and the pre-defined probabilistic generative model defines (a) a probability distribution over a set of fieldnames, a set of annotation for each fieldname, the knowledge graph and (b) a stochastic process to generate the set of fieldnames, the set of annotation for each field name, where the training technique comprises one of a supervised training and an unsupervised training, wherein training the pre-defined probabilistic generative model to obtain the trained model comprises:

determine whether the input is an unannotated relational data or an annotated relational data, and perform, upon determining, one of:

on determining the input as the annotated relational data, performing the supervised training, wherein the supervised training is optimizing the knowledge graph (G) and the set of associated parameters using a Maximum Likelihood Estimation (MLE) technique; and on determining the input is the unannotated relational data, performing the unsupervised training, wherein the unsupervised training is based on the Expectation Maximization (EM) technique, wherein the EM technique includes performing a pre-defined number of iterations of an expectation process and a maximization process, wherein the expectation process is performed using the plurality of annotations and the maximization process is performed using the knowledge graph (G) and the set of associated parameters; and perform a plurality of tasks using the trained model, wherein the plurality of tasks comprises of generating a plurality of new fieldnames for a new relational schema through a stochastic generative process and generating a new annotation for a fieldname of a new relational schema through a probabilistic inference technique, wherein the stochastic generative process for generating the fieldname of the new relational schema comprises sampling a path from the knowledge graph and further sampling a fieldname from the path, wherein the probabilistic inference technique for generating the annotation comprises:

enumerating a plurality of annotations for the fieldname;

computing a probability score for each of the enumerated annotations based on a probability score computing technique; and identifying an annotation for the fieldname, based on the set of probability scores;

wherein the step for sampling the path from the knowledge graph comprises:

identifying a starting concept to be sampled by using distribution Pf, then a stop or a continue is sampled from distribution Pl, when stop is sampled, then the path sampling process stops, if continue is sampled, the next concept in the path is sampled, wherein first the type of relationship to the next concept is sampled using the distribution Pi, further the next concept is sampled using the distribution Pt, further stop or continue is sampled using the distribution Pl.

3. One or more non-transitory machine-readable information storage mediums comprising one or more instructions which when executed by one or more hardware processors cause:

receiving an input associated with a relational schema of a database, via a one or more hardware processors, the input comprising a plurality of relational data and a knowledge graph of a domain, wherein the plurality of relational data comprises of one of an annotated relational data and an unannotated relational data, wherein the unannotated relational data comprises of a plurality of fieldnames and the annotated relational data comprises of the plurality of fieldnames and an annotation for each fieldname of the plurality of fieldnames, wherein the knowledge graph comprises of a plurality of vertices and a plurality of edges, and wherein each of the plurality of vertices represents a domain concept and each of the edge represents a typed relationship between two vertices of the plurality vertices, and the knowledge graph comprises of one of an empty knowledge graph and a partially filled knowledge graph, wherein the empty knowledge graph does not comprise any vertices or any edges and the partially filled knowledge graph comprises at least one vertex, wherein the annotation is a path in the knowledge graph associated with the fieldname;

training a pre-defined probabilistic generative model using the input to obtain a trained model, by the one or more hardware processors, the trained model comprising of the knowledge graph (G) and a set of associated parameters ($\theta$) through a training technique, wherein the set of parameters($\theta$) of the trained model are associated with a plurality of concepts and a plurality of relationships of the knowledge graph and the pre-defined probabilistic generative model defines (a) a probability distribution over a set of fieldnames, a set of annotation for each fieldname, the knowledge graph and (b) a stochastic process to generate the set of fieldnames, the set of annotation for each field name, where the training technique comprises one of a supervised training and an unsupervised training, wherein training the pre-defined probabilistic generative model to obtain the trained model comprises:

determining whether the input is an unannotated relational data or an annotated relational data, and performing, upon determining, one of:

on determining the input as the annotated relational data, performing the supervised training, wherein the supervised training is optimizing the knowledge graph (G) and the set of associated parameters using a Maximum Likelihood Estimation (MLE) technique; and on determining the input is the unannotated relational data, performing the unsupervised training, wherein the unsupervised training is based on the Expectation Maximization (EM) technique, wherein the EM technique includes performing a pre-defined number of iterations of an expectation process and a maximization process, wherein the expectation process is performed using the plurality of annotations and the maximization process is performed using the knowledge graph (G) and the set of associated parameters; and performing a plurality of tasks using the trained model, wherein the plurality of tasks comprises of generating a plurality of new fieldnames for a new relational schema through a stochastic generative process and generating a new annotation for a fieldname of a new relational schema through a probabilistic inference technique, wherein the stochastic generative process for generating the fieldname of the new relational schema comprises sampling a path from the knowledge graph and further sampling a fieldname from the path, wherein the probabilistic inference technique for generating the annotation comprises:

enumerating a plurality of annotations for the fieldname;

computing a probability score for each of the enumerated annotations based on a probability score computing technique; and identifying an annotation for the fieldname, based on the set of probability scores;

wherein the step for sampling the path from the knowledge graph comprises:

identifying a starting concept to be sampled by using distribution Pf, then a stop or a continue is sampled from distribution Pl, when stop is sampled, then the path sampling process stops, if continue is sampled, the next concept in the path is sampled, wherein first the type of relationship to the next concept is sampled using the distribution Pi, further the next concept is sampled using the distribution Pt, further stop or continue is sampled using the distribution Pl.

* * * * *